3,026,938
PROPPING AGENT FOR A FRACTURING PROCESS
Jimmie L. Huitt, Glenshaw, Bruce B. McGlothlin, Aspinwall, and John Papaila, Logans Ferry Heights, Pa., assignors to Gulf Research & Development Company, Pittsburgh, Pa., a corporation of Delaware
Filed Sept. 2, 1958, Ser. No. 758,535
6 Claims. (Cl. 166—42)

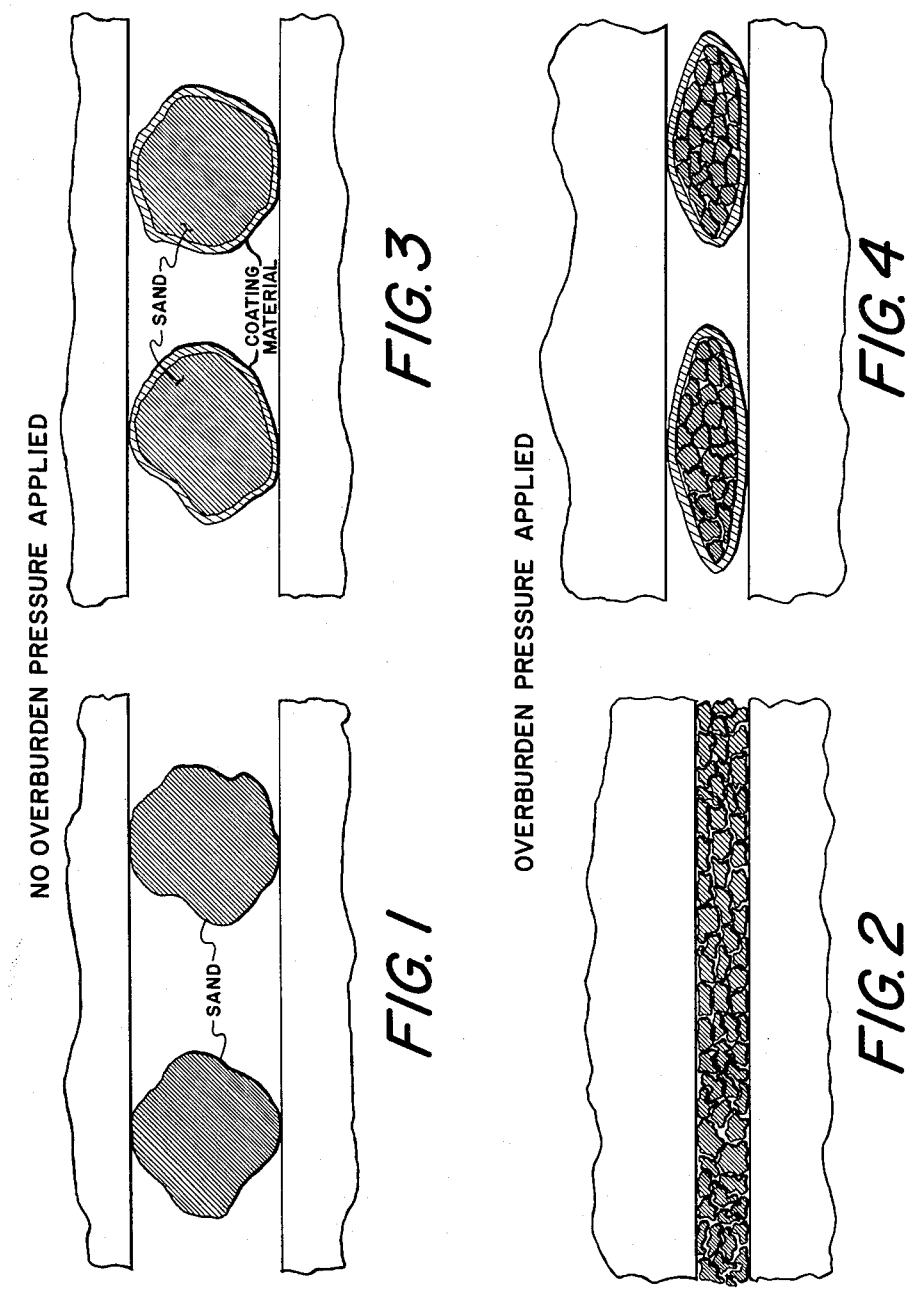

This invention relates to a method for treating wells. It is more specifically concerned with the art of fracturing formations, and still more particularly with a process for hydraulically fracturing formations with the aid of solid propping agents.

Within recent years, hydraulic fracturing processes have been employed to create artificial fractures adjacent a producing well to increase the productivity of the fluid bearing formation. In general, such processes consist in forcing a fracturing fluid into a producing well in sufficient volume and under sufficient pressure to rupture the formation. The fracturing fluid is forced to enter the induced crack and extend the fracture for substantial distances into the formation. After the injection pressure has been released the fracture produced in the formation tends to close due to the weight of the overburden. In order to keep the fracture open, granular insoluble solids such as sand are usually suspended in the fracturing medium. The granular solids upon being carried into the fracture act as props and hold open the fracture after the injection pressure is released.

In many instances, the increase in productivity of the formation as a result of the fracture is disappointingly small. One explanation for this is that the propping agents are crushed into small fragments by the action of the overburden load. The small crushed fragments tend to disperse throughout the fracture and fail to maintain an adequately wide fracture having the desired high flow capacity. This problem is encountered particularly in earth formations which are hard, that is, earth formations that tend to crush rather than embed and enfold around the particles of the propping agent.

It has now been found that this problem is overcome and that wide fractures of high fluid carrying capacity are obtained by the use as propping agents in hydraulic fracturing operations of solid particles having an adherent non-brittle plastic coating over the surfaces thereof. The adherent coating is plastic in the sense that it is flexible and under compression tends to deform rather than rupture. The coating on the surface of the solid particles serves to confine and prevent dispersion of the small fragments of the propping material throughout the fracture as would normally occur due to the crushing action of the earth formation. The coated particles when lodged in place in the earth formation function to maintain fractures of considerably greater width and flow capacity than normally obtained by prior art propping agents.

The granular solid particles which are coated to form the propping agents of the invention can be any of the granular solids which are employed in the art as propping agents or spacer materials and include such materials as for example, wood chips, crushed coke, sand, granulated slag, pulverized coal, crushed rock such as crushed limestone, spent catalyst materials and the like. Certain of these materials such as sand and similar materials can be characterized as being friable and elastic in nature and disintegrate upon crushing by the earth formation with a sudden release of energy that causes the crushed fragments to disperse widely. These materials benefit most by coating in accordance with the invention.

The particle size of the granular solid propping agents may vary over wide ranges and will depend upon certain characteristics of the formation such as for example, its permeability prior to fracturing and the overburden pressure. In any event, the particles should be small enough to pass into the cracks or fractures produced in the formation but not so small as to cause the fracture to exhibit low fluid permeability when deposited within the earth formation. In general, the particle size ranges from about 4 to about 100 mesh United States sieve. The optimum particle size can be readily determined in each instance in accordance with conventional principles applied in fracturing.

The selected particles of desired size are coated with a material as hereinafter indicated in an amount to provide a thin film on each particle. The amount of coating material required depends upon the size of the particles and the nature of the particular solid material. When properly coated, a visible film should completely envelop the individual particles. Thus, the amount of the coating material required in each instance can be readily determined simply by mixing various proportions of the particulated solids and coating material and inspecting the resulting mass for the existence of the film. Excessively thick coatings which would materially alter the particle size are to be avoided. In general, the thickness of the coating applied to the particles is on the order of about 0.001 to 0.025 inch.

Coating of the particles is effected in any convenient manner. One method of coating the particles is to tumble them in a barrel type mixer, for example, a concrete mixer, with the coating material until each particle is substantially completely coated. Another method of coating the finely divided particles is to spray them with a suitable coating material.

The material employed in accordance with the invention to coat the solid inert particles can be any material which is capable of providing on the particles an adherent non-brittle plastic film which under compression tends to deform rather than rupture. The coating materials employed are of a nature so as to be substantially insoluble or at most not readily soluble in the hydraulic fracturing fluid or formation fluids in order to permit placing and retaining of the particles in the fracture with the coating intact. Thus, the selection of the particular coating material to be employed in each instance will be governed by the fracturing fluid employed and also the fluids which are expected to be encountered within the producing formation.

A wide variety of natural or synthetic film-forming materials are thus suited for purposes of the invention. As illustrative of suitable materials, the following are cited: natural rubber, elastomers such as butyl rubber and polyurethane rubber, various starches, petroleum pitch, tar and asphalt, organic semisolid silicon polymers such as dimethyl and methylphenyl silicones, polyhydrocarbons such as polyethylene, polypropylene, polyisobutylene, cellulose and nitrocellulose lacquers, vinyl resins such as polyvinylacetate, phenolformaldehyde resins, urea formaldehyde resins, acrylic ester resins such as polymerized ester resins of methyl, ethyl, and butyl esters of acrylic and α-methylacrylic acids, epoxy resins, melamine resins, drying oils, mineral and petroleum waxes, and the like.

To achieve optimum results with the propping agents of the invention, it is essential that the coated particles be prevented from so sticking together or agglomerating as to prevent their suspension in the fracturing fluid and introduction into the well formation. Agglomeration of the particles within the fracture to form a monolithic structure is also to be avoided, since this results in a considerable reduction in permeability of the fracture. Where the selected coating material is of a very tacky nature, the coated particles can be treated to render the particles less tacky. For example, if the coated particles are found to be undesirably tacky in nature, this condition can be corrected simply by dusting the particles with an inert powdered material such as talc or wood flour.

The following experimental operations and data illustrate the advantages obtained by the use of the coated propping agents of the invention.

A simulated fracture was achieved utilizing two square brass plates which were found to offer approximately the same resistance to embodiment of the particles as did a typical hard earth formation. The surface of the plates were roughened by repeated crushing of sand grains between them to simulate a fractured surface. The brass plates were fitted with side and end seals, a flow entrance and exit and pressure taps to form a flow cell.

Various propping agents were tested by placing monolayers of the propping agents in the flow cell in a somewhat random pattern that was controlled to the extent that no direct flow paths across the flow cell existed. The flow cell was then assembled and placed in a hydraulic press where the plates were forced together to simulate a desired overburden pressure. The width of the fracture maintained by the propping agents was determined by measuring the distance between the brass plates by means of a cathetometer. Water was flowed through the cell and the flow capacity of the fracture calculated from the volume of water passing through the fracture and the pressure differential existing across the flow path from inlet to outlet. This procedure simulates a horizontal fracture in which there is substantially no fluid leak into the pores of the formation.

Utilizing this procedure, grains of 4-6 mesh sand were distributed between the plates which were then forced together in the hydraulic press until the force exerted on the plates was equivalent to an overburden pressure of about 3000 pounds per square inch. Water was then flowed through the simulated fracture and the flow capacity and fracture width determined as previously indicated. This procedure was then repeated using the same number of grains of the same sand as above which had first been coated with a thin rubber latex film. The rubber latex coating was applied by dipping the sand particles individually into an aqueous solution of rubber latex. The rubber latex solution comprising a styrene-butadiene copolymer was purchased from Pittsburgh Plate Glass Company and bore their designation S-6689. After the particles were removed from the rubber latex solution, the particles were then dipped into a solution of aluminum sulfate which functioned to cure or set the adherent film and left a non-tacky rubber coating on the particles. The thickness of the rubber film on the sand particles was approximately 0.007 inch.

The results obtained from the above two procedures were as follows:

*Uncoated Sand Particles*

Fracture width _____millimeters__ 0.68
Flow Capacity _____millidarcy feet__ 200

*Coated Sand Particles*

Fracture width _____millimeters__ 1.33
Flow Capacity _____millidarcy feet__ 90,000

As seen from the above-presented data, the sand particles coated in accordance with the invention maintained fractures of exceedingly greater flow capacity and approximately twice the width than those obtained with the uncoated sand particles.

In the accompanying drawings, there is shown a comparison of the coated and uncoated sand particles, before and after subjection to the simulated overburden pressure.

FIGURE 1 shows uncoated sand particles before subjection to the overburden pressure.

FIGURE 2 shows uncoated sand particles after subjection to the overburden pressure.

FIGURE 3 shows coated sand particles before subjection to the overburden pressure.

FIGURE 4 shows coated sand particles after subjection to the overburden pressure.

As seen from the drawings, the uncoated sand particles are crushed by the overburden load and the small crushed fragments are widely dispersed throughout the fracture. In contrast, with the coated sand particles the crushed fragments are confined by the flexible plastic coating and form a relatively compact mass which effectively supports the overburden to maintain a wide fracture. Moreover, the coating on the particles prevents the formation of a flow constriction in the propped fracture due to migration and agglomeration of the crushed fragments.

The coated propping agents included within this invention can be employed in place of conventional propping agents with no change in fracturing technique. The coated propping agents can be used with any of the conventional fracturing fluids as long as the fluid does not impair the qualities of the plastic coating. Either oil or water base fracturing fluids which may or may not contain soaps or other thickening agents can be employed to suspend the coated propping agents and to carry them into the formation fracture.

The coated propping agents can be employed in fracturing fluids in amounts varying over wide limits in accordance with conventional practice. Thus, for example, the propping agents can be employed in amounts from about 0.05 pound/gallon to 10 pounds/gallon or more. As is known to the art, the permeability of a fracture appears to go through a maximum when plotted against concentration of propping agent. It has been found that with the coated propping agents of the invention the maximum permeability of the fracture is attained with lower concentrations of the propping agent. Thus, in general, smaller amounts of the coated propping agents can be utilized in fracturing operations.

In a specific embodiment of the invention, a packer is located and set in the well on the tubing to isolate and confine a selected producing zone which is to be fractured. A viscous fracturing fluid consisting of a crude oil gelled with a sodium soap of a fatty acid is then pumped into the well. The fracturing fluid is continuously pumped into the well until fracture occurs which event is usually indicated by a sudden decrease in pump pressure. After fracture occurs, a propping agent consisting of quartz sand particles of about 8-10 mesh size which have been coated with asphalt are incorporated into the fracturing fluid. The propping agent consisting of the asphalt coated particles is mixed into the fracturing fluid as it is pumped into the well at a rate to provide about 3 pounds of the propping agent per gallon of fracturing fluid. The fracturing fluid containing the coated propping agent in suspended form is continuously pumped into the well to extend the fracture and to deposit the propping agent within the fracture. After the well has been shut in for a sufficient time, the viscosity of the fracturing fluid is sufficiently reduced by commingling with the formation fluids to permit its withdrawal from the well as part of the well effluent during subsequent production. The coated particles comprising the propping agent are deposited and remain within the fracture to maintain it open and increase its fluid carrying capacity.

It is to be understood that the foregoing description of a specific embodiment of the invention is by way of illustration only and that various changes can be made in the operational and manipulative techniques of the hydraulic fracturing process without departing from the invention. Moreover, the principles of the invention can be applied to hydraulic fracturing operations which are combined with other types of treatments associated with hydraulic fracturing. Furthermore, the principles of the invention can be advantageously be applied to the treatment of injection and disposal wells.

The coated propping agents of the invention are advantageously utilized in fracturing oil, gas or water formations to produce therein very wide fractures of exceptionally high permeability. The coated propping agents are particularly useful in hard formations, that is, formations which exert an appreciable crushing or pulverizing action on the propping agents. The coated propping agents of the invention offer economic advantages also in that smaller amounts of these agents are effective in maintaining highly permeable fractures of substantial width.

Those modifications and equivalents which fall within the spirit of the invention and the scope of the appended claims are to be considered part of the invention.

We claim:

1. A process for increasing the productivity of a subterranean formation penetrated by a well bore which comprises forcing a fracturing fluid down said well and into said formation under sufficient pressure to fracture said formation, and displacing into said fracture fracturing fluid having suspended therein particles of a propping agent, the said propping agent comprising solid particles having over the surfaces thereof a coating of a deformable solid material substantially insoluble in the fracturing fluid encapulsating the solid particles whereby fragments of the solid particles are confined within the coating, said particles of the propping agent being substantially nonadherent to one another.

2. The process of claim 1 wherein the said solid particles are sand particles.

3. A process for increasing the productivity of a subterranean formation penetrated by a well bore which comprises forcing a fracturing fluid down said well and into said formation under sufficient pressure to fracture said formation, and displacing into said fracture fracturing fluid having particles of a solid propping agent suspended therein, the said propping agent comprising solid particles having over the surfaces thereof a coating approximately 0.001 to 0.025 inch thick of a deformable solid material substantially insoluble in the fracturing fluid whereby fragments of the solid particles resulting from crushing thereof are confined within the coating, said particles of the propping agent being substantially nonadherent to one another.

4. The process of claim 1 wherein the deformable material coating the solid particles of the propping agent is petroleum asphalt.

5. The process of claim 1 wherein the deformable material coating the solid particles is deformable plastic.

6. The process of claim 1 wherein the deformed material coating the solid particles is an elastomer.

References Cited in the file of this patent

UNITED STATES PATENTS

| | | |
|---|---|---|
| 2,596,844 | Clark | May 13, 1952 |
| 2,811,207 | Clark | Oct. 29, 1957 |
| 2,823,753 | Henderson et al. | Feb. 18, 1958 |
| 2,838,116 | Clark et al. | June 10, 1958 |
| 2,860,709 | Rieger | Nov. 18, 1958 |
| 2,879,847 | Irwin | Mar. 31, 1959 |
| 2,888,988 | Clark | June 2, 1959 |
| 2,912,402 | Less et al. | Nov. 10, 1959 |
| 2,912,406 | Less et al. | Nov. 10, 1959 |

FOREIGN PATENTS

| | | |
|---|---|---|
| 201,013 | Austria | Dec. 10, 1958 |

OTHER REFERENCES

Newest Method to Control Unconsolidated Sands by B. J. Ladd and K. E. Terrell, The Petroleum Engineer, December 1955, B–112 to B–117, inclusive.

UNITED STATES PATENT OFFICE
CERTIFICATE OF CORRECTION

Patent No. 3,026,938                                  March 27, 1962

Jimmie L. Huitt et al.

It is hereby certified that error appears in the above numbered patent requiring correction and that the said Letters Patent should read as corrected below.

Column 3, line 10, for "embodiment" read -- embedment --; column 4, line 61, for "effiuent" read -- effluent --; line 74, strike out "be", first occurrence.

Signed and sealed this 24th day of July 1962.

(SEAL)
Attest:

ERNEST W. SWIDER
Attesting Officer

DAVID L. LADD
Commissioner of Patents